United States Patent
Ma et al.

(10) Patent No.: US 11,614,527 B2
(45) Date of Patent: Mar. 28, 2023

(54) SELF-ADAPTIVE LIDAR-CAMERA SYNCHRONIZATION SYSTEM

(71) Applicant: CYNGN, INC., Menlo Park, CA (US)

(72) Inventors: Biao Ma, Sunnyvale, CA (US); Lior Tal, San Diego, CA (US)

(73) Assignee: CYNGN, INC., Menlo Park, CA (US)

( * ) Notice: Subject to any disclaimer, the term of this patent is extended or adjusted under 35 U.S.C. 154(b) by 0 days.

(21) Appl. No.: 17/808,055

(22) Filed: Jun. 21, 2022

(65) Prior Publication Data
US 2022/0404478 A1    Dec. 22, 2022

Related U.S. Application Data

(60) Provisional application No. 63/366,738, filed on Jun. 21, 2022, provisional application No. 63/213,130,
(Continued)

(51) Int. Cl.
*G01S 7/497* (2006.01)
*G01S 17/86* (2020.01)
(Continued)

(52) U.S. Cl.
CPC ............ *G01S 7/497* (2013.01); *G01S 7/4876* (2013.01); *G01S 7/4913* (2013.01); *G01S 17/86* (2020.01);
(Continued)

(58) Field of Classification Search
CPC ........ G01S 17/89; G01S 17/86; G01S 17/931; G01S 7/497; G01S 17/42; G01S 7/4817;
(Continued)

(56) References Cited

U.S. PATENT DOCUMENTS 10,447,973 B2 * 10/2019 Droz .................. G01S 17/86
10,771,669 B1 *  9/2020 Balasubramanian ... G01S 17/87
(Continued)

FOREIGN PATENT DOCUMENTS

WO    2004/013654 A1    2/2004
WO    2019/079511 A1    4/2019

OTHER PUBLICATIONS

PCT International Search Report and Written Opinion issued in corresponding application No. PCT/US2022/034414 dated Sep. 14, 2022.

*Primary Examiner* — Olumide Ajibade Akonai
(74) *Attorney, Agent, or Firm* — Maschoff Brennan

(57) ABSTRACT

A method may include determining an alignment time based on a zero-crossing point corresponding to a LiDAR sensor and a horizontal field of view corresponding to an image-capturing sensor. The method may include determining a delay timing for initiating image capturing by the image-capturing sensor in which the delay timing is based on at least one of: the alignment time, a packet capture timing corresponding to the LiDAR sensor, and an average frame exposure duration corresponding to the image-capturing sensor. The method may include initiating data capture by the LiDAR sensor, and after the initiating of data capture by the LiDAR sensor and after the delay timing has elapsed, initiating data capture by the image-capturing sensor.

14 Claims, 10 Drawing Sheets

Related U.S. Application Data filed on Jun. 21, 2021, provisional application No. 63/213,132, filed on Jun. 21, 2021, provisional application No. 63/213,131, filed on Jun. 21, 2021.

(51) Int. Cl.
| | |
|---|---|
| *H04L 7/00* | (2006.01) |
| *H04N 5/232* | (2006.01) |
| *G01S 7/4913* | (2020.01) |
| *G01S 17/931* | (2020.01) |
| *G01S 7/487* | (2006.01) |
| *G01S 17/89* | (2020.01) |
| *G06T 17/20* | (2006.01) |
| *G06T 19/20* | (2011.01) |
| *H04N 23/951* | (2023.01) |

(52) U.S. Cl.
CPC ............ *G01S 17/89* (2013.01); *G01S 17/931* (2020.01); *G06T 17/20* (2013.01); *G06T 19/20* (2013.01); *H04L 7/0041* (2013.01); *H04N 23/951* (2023.01); *G06T 2219/2016* (2013.01)

(58) Field of Classification Search
CPC ........ G01S 7/4972; G01S 7/40; G01S 7/4808; G01S 19/485; G01S 13/931; G01S 7/023; G01S 7/52004; G01S 17/894; G01S 17/87; B60W 2420/52; G06T 2207/20221; G06V 20/56; G06V 30/1918; H04N 5/04; H04N 13/167
See application file for complete search history.

(56) References Cited

U.S. PATENT DOCUMENTS

| | | | |
|---|---|---|---|
| 2019/0011544 A1* | 1/2019 | Gassend | G01S 7/4813 |
| 2019/0098233 A1* | 3/2019 | Gassend | G01S 17/42 |
| 2019/0120948 A1* | 4/2019 | Yang | G01S 7/497 |
| 2019/0353784 A1 | 11/2019 | Toledano et al. | |
| 2021/0003710 A1* | 1/2021 | Tan | H04N 5/3532 |
| 2021/0190923 A1* | 6/2021 | Golomedov | G01S 7/497 |
| 2021/0407130 A1* | 12/2021 | Qian | G06V 20/588 |
| 2022/0050188 A1* | 2/2022 | Laverne | G01J 3/0289 |
| 2022/0277193 A1* | 9/2022 | Wekel | G06N 3/08 |

\* cited by examiner

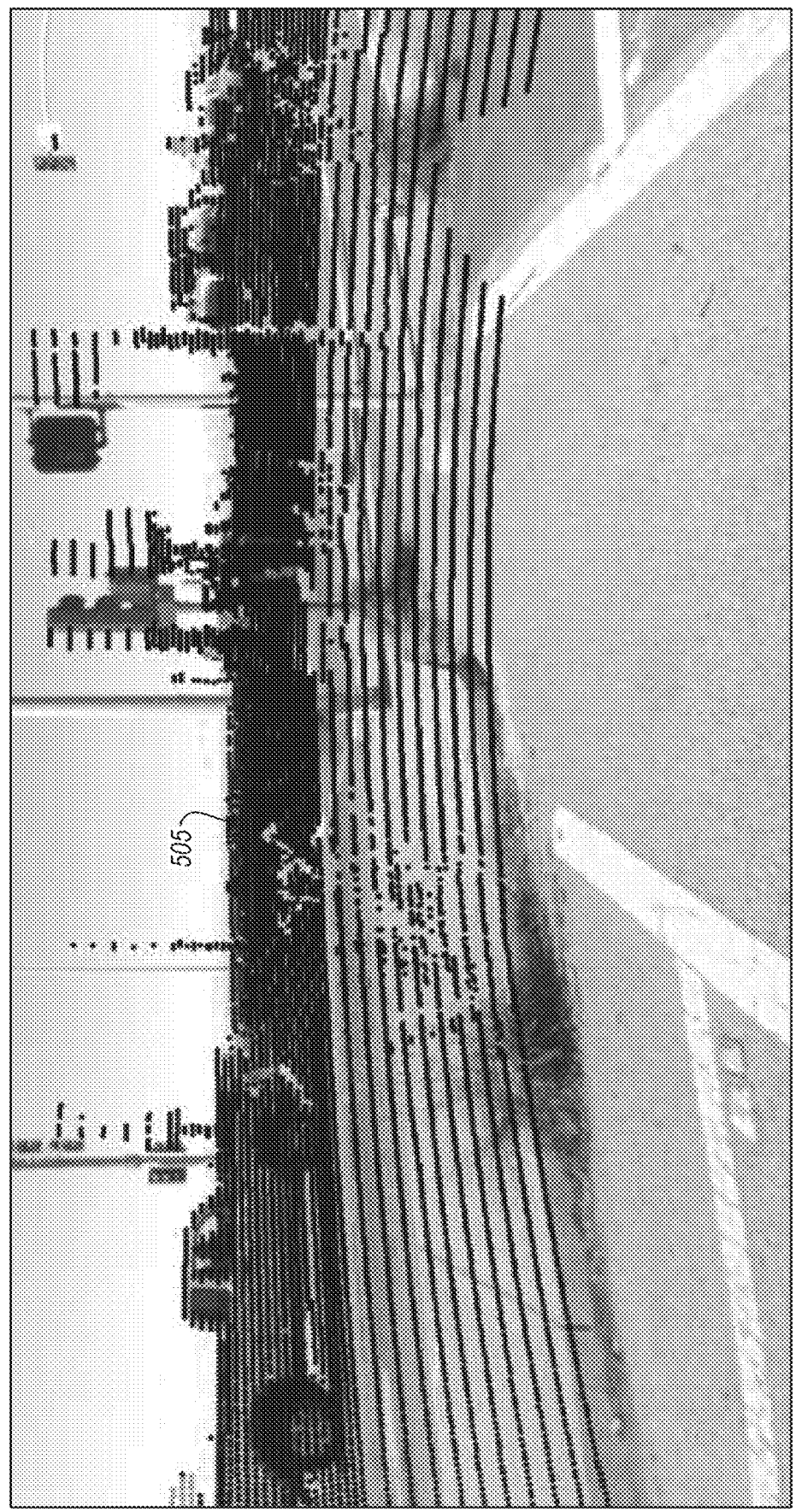
FIG. 5A  Before Synchronization

After Synchronization

SELF-ADAPTIVE LIDAR-CAMERA SYNCHRONIZATION SYSTEM

CROSS-REFERENCE TO RELATED APPLICATIONS

This application claims the benefit of U.S. patent application Ser. No. 63/213,130, filed on Jun. 21, 2021, U.S. patent application Ser. No. 63/213,131, filed on Jun. 21, 2021, U.S. patent application Ser. No. 63/213,132, filed on Jun. 21, 2021, and U.S. patent application Ser. No. 63/366,738, filed on Jun. 21, 2022; the disclosures of which are incorporated herein by reference in their entireties.

FIELD OF THE INVENTION

The present disclosure generally relates to a self-adaptive LiDAR-camera synchronization system.

BACKGROUND

An autonomous vehicle may scan an environment in which the autonomous vehicle is located using one or more sensors positioned on and/or around the autonomous vehicle. The autonomous vehicle may detect objects based on data collected by the sensors and avoid objects in a path of travel of the autonomous vehicle based on the detected objects.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include determining an alignment time based on a zero-crossing point corresponding to a LiDAR sensor and a horizontal field of view corresponding to an image-capturing sensor. The method may include determining a delay timing for initiating image capturing by the image-capturing sensor in which the delay timing is based on at least one of: the alignment time, a packet capture timing corresponding to the LiDAR sensor, and an average frame exposure duration corresponding to the image-capturing sensor. The method may include initiating data capture by the LiDAR sensor, and after the initiating of data capture by the LiDAR sensor and after the delay timing has elapsed, initiating data capture by the image-capturing sensor. The method may include calculating a synchronization error time based on the delay timing and assessing an accuracy of a LiDAR-camera synchronization process based on the synchronization error time over a period of time.

In some embodiments, the packet capture timing corresponding to the LiDAR sensor may include at least one of: a first time delay between capture of a packet of LiDAR data and sending of the packet to a LiDAR driver, a second time delay between reception of the packet by the LiDAR driver and sending of the packet to an image-capturing driver, a third time delay between reception of the packet by the image-capturing driver and sending of the packet to the image-capturing sensor, and a fourth time delay between reception of the packet by the image-capturing sensor and prompting the image-capturing sensor to capture image data.

In some embodiments, the average frame exposure durations corresponding to the image-capturing sensor may be a running average of two or more of the most recent frame exposure durations.

In some embodiments, the method may further comprise determining a synchronization error time, wherein the synchronization error time is a period of time corresponding to a correction window for synchronization of the LiDAR sensor and the image-capturing sensor and the delay timing is based on the synchronization error time. In these and other embodiments, the method may further comprise determining an average synchronization error time and adjusting the delay timing responsive to the average synchronization error time exceeding a first threshold value. In some embodiments, the method may further comprise determining a variance in the synchronization error time and adjusting the delay timing responsive to the variance in the synchronization error time exceeding a second threshold value.

In some embodiments, the image-capturing sensor may be a camera.

According to an aspect of an embodiment, one or more non-transitory computer-readable storage media may be configured to store instructions that, in response to being executed, cause the system to perform operations. The operations may include determining an alignment time based on a zero-crossing point corresponding to a LiDAR sensor and a horizontal field of view corresponding to an image-capturing sensor. The operations may include determining a delay timing for initiating image capturing by the image-capturing sensor in which the delay timing is based on at least one of: the alignment time, a packet capture timing corresponding to the LiDAR sensor, and an average frame exposure duration corresponding to the image-capturing sensor. The operations may include initiating data capture by the LiDAR sensor, and after the initiating of data capture by the LiDAR sensor and after the delay timing has elapsed, initiating data capture by the image-capturing sensor. The operations may include calculating a synchronization error time based on the delay timing and assessing an accuracy of a LiDAR-camera synchronization process based on the synchronization error time over a period of time.

In some embodiments, the packet capture timing corresponding to the LiDAR sensor may include at least one of: a first time delay between capture of a packet of LiDAR data and sending of the packet to a LiDAR driver, a second time delay between reception of the packet by the LiDAR driver and sending of the packet to an image-capturing driver, a third time delay between reception of the packet by the image-capturing driver and sending of the packet to the image-capturing sensor, and a fourth time delay between reception of the packet by the image-capturing sensor and prompting the image-capturing sensor to capture image data.

In some embodiments, the average frame exposure durations corresponding to the image-capturing sensor may be a running average of two or more of the most recent frame exposure durations.

In some embodiments, the operations may further comprise determining a synchronization error time, wherein the synchronization error time is a period of time corresponding to a correction window for synchronization of the LiDAR sensor and the image-capturing sensor and the delay timing is based on the synchronization error time. In these and other embodiments, the operations may further comprise determining an average synchronization error time and adjusting the delay timing responsive to the average synchronization error time exceeding a first threshold value. In some embodiments, the operations may further comprise determining a variance in the synchronization error time and adjusting the delay timing responsive to the variance in the synchronization error time exceeding a second threshold value.

In some embodiments, the image-capturing sensor may be a camera.

According to an aspect of an embodiment, a system may include one or more processors, a Light Detection and Ranging (LiDAR) sensor, an image-capturing sensor coupled to the LiDAR sensor at the same position as the LiDAR sensor, and one or more non-transitory computer-readable storage media configured to store instructions that, in response to being executed, cause the system to perform operations. The operations may include determining an alignment time based on a zero-crossing point corresponding to a LiDAR sensor and a horizontal field of view corresponding to an image-capturing sensor. The operations may include determining a delay timing for initiating image capturing by the image-capturing sensor in which the delay timing is based on at least one of: the alignment time, a packet capture timing corresponding to the LiDAR sensor, and an average frame exposure duration corresponding to the image-capturing sensor. The operations may include initiating data capture by the LiDAR sensor, and after the initiating of data capture by the LiDAR sensor and after the delay timing has elapsed, initiating data capture by the image-capturing sensor. The operations may include calculating a synchronization error time based on the delay timing and assessing an accuracy of a LiDAR-camera synchronization process based on the synchronization error time over a period of time.

In some embodiments, the packet capture timing corresponding to the LiDAR sensor may include at least one of: a first time delay between capture of a packet of LiDAR data and sending of the packet to a LiDAR driver, a second time delay between reception of the packet by the LiDAR driver and sending of the packet to an image-capturing driver, a third time delay between reception of the packet by the image-capturing driver and sending of the packet to the image-capturing sensor, and a fourth time delay between reception of the packet by the image-capturing sensor and prompting the image-capturing sensor to capture image data.

In some embodiments, the average frame exposure durations corresponding to the image-capturing sensor may be a running average of two or more of the most recent frame exposure durations.

In some embodiments, the operations may further comprise determining a synchronization error time, wherein the synchronization error time is a period of time corresponding to a correction window for synchronization of the LiDAR sensor and the image-capturing sensor and the delay timing is based on the synchronization error time. In these and other embodiments, the operations may further comprise determining an average synchronization error time and adjusting the delay timing responsive to the average synchronization error time exceeding a first threshold value. In some embodiments, the operations may further comprise determining a variance in the synchronization error time and adjusting the delay timing responsive to the variance in the synchronization error time exceeding a second threshold value.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which:

FIG. 5A illustrates an overlay of LiDAR data captured by the LiDAR sensor and image data captured by the image-capturing sensor before synchronization of the LiDAR data and the image data;

DETAILED DESCRIPTION

Figure 1:
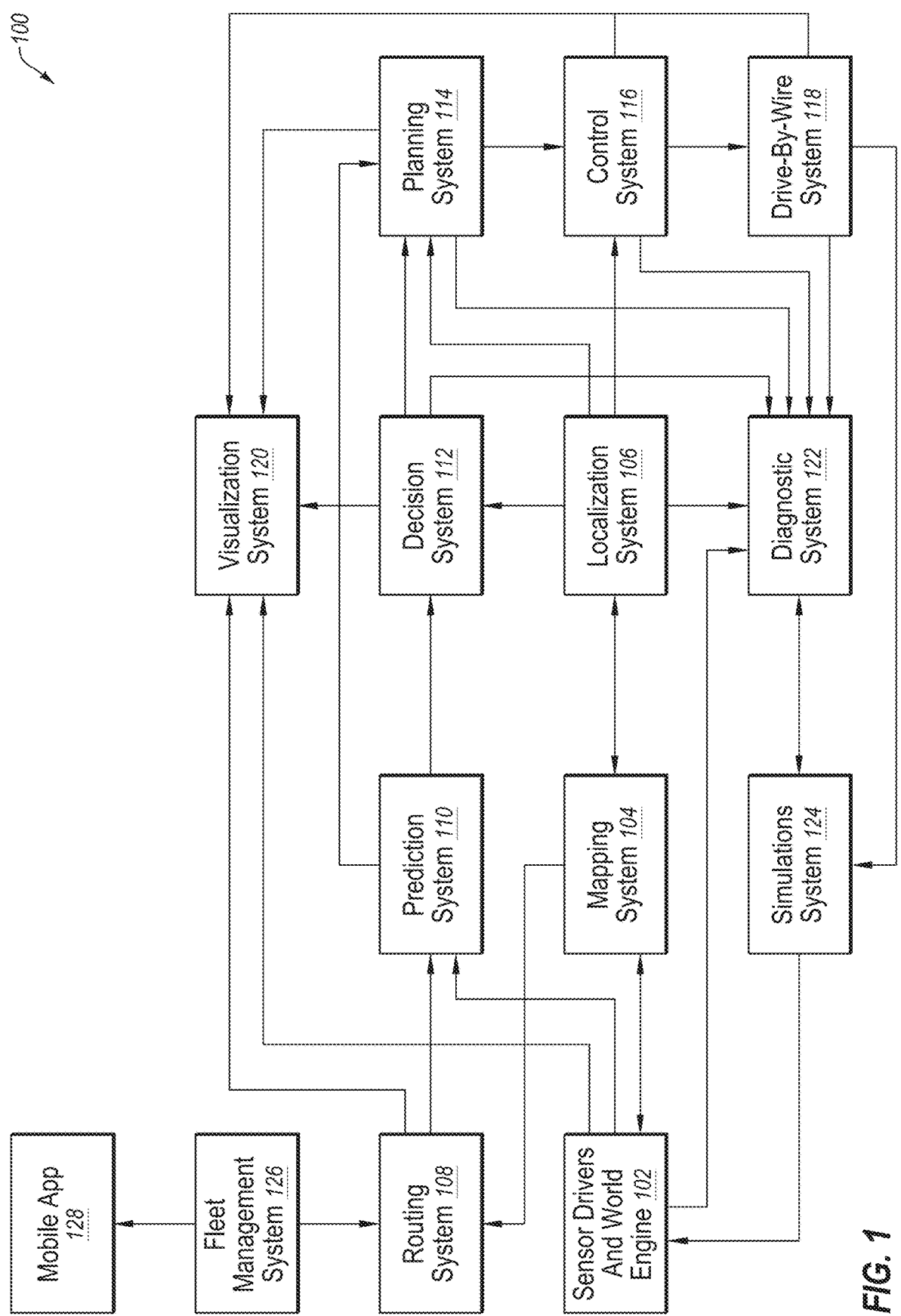
FIG. 1 illustrates an example embodiment of an autonomous driving system according to at least one embodiment of the present disclosure.

Object-detection systems for autonomous vehicles may include light detection and ranging (LiDAR) sensors and image-capturing sensors (e.g., camera sensors), which may experience data synchronization problems because of differences in timing and trigger methods between the LiDAR sensors and the image-capturing sensors. Existing perception systems that use both LiDAR sensors and image-capturing sensors do not include robust processes for synchronizing the sensor data captured by the LiDAR sensors (e.g., LiDAR data) and the sensor data captured by the image-capturing sensors (e.g., image data) in real time at precise and high-frequency levels because neither computer systems associated with the LiDAR sensors nor computer systems associated with the image-capturing sensors may be configured to perform operations for synchronizing captured sensor data with sensor data captured by other sensors. In other words, existing perception systems may include long delays when attempting to synchronize captured LiDAR data and image data during which an autonomous vehicle may have already traveled several feet or meters, rendering the synchronized sensor data inaccurate and inoperative. Additionally, existing perception systems may include a hard-coded synchronization delay between LiDAR data capture and image data capture or no delay adjustments at all to synchronize data capture between the two sensor systems.

The present disclosure may relate to precise and real-time synchronization of LiDAR data captured by one or more LiDAR sensors and image data captured by one or more image-capturing sensors. The LiDAR data and the image data may be synchronized at high frequencies, such as at half-millisecond-level data-capturing frequencies rounded to approximately 0.005 seconds, so that the synchronized data may be applied to downstream computations relating to localization, routing, trajectory prediction, decision-making, or any other driving processes associated with operations of an autonomous vehicle. Additionally or alternatively, a self-adaptive LiDAR-camera synchronization system according to the present disclosure may, among other things, reduce the degree of synchronization error between LiDAR data and image data captured by object-detection sensor systems used by autonomous vehicles. Because vehicles operating on roadways may move at speeds that result in traveling several feet or meters per second, synchronizing captured sensor data is important to providing accurate information that downstream systems may use to make driving decisions.

Synchronizing the data capturing between a LiDAR sensor and an image-capturing sensor using the self-adaptive LiDAR-camera synchronization system may involve determining a delay timing between initiation of data capture by the LiDAR sensor and initiation of data capture by the image-capturing sensor. The delay timing may include an alignment timing component that accounts for differences in the fields of view and data-capturing ranges of the LiDAR sensor and the image-capturing sensor. The delay timing may additionally or alternatively account for communication times and/or communication latencies between software components and/or hardware components, which may be represented as a packet-capture timing. Additionally or alternatively, the delay timing may account for an average frame exposure duration associated with operation of the image-capturing sensor such as a shutter speed. These various factors may operate together such that when data is captured by the LiDAR sensor and the image-capturing sensor, both sets of data represent the same things at the same time from the same view. This may be accomplished despite the capture speed of the two different sensors potentially being different, and despite the LiDAR sensor potentially including a rotating field of view and the image-capturing sensor potentially including a different rotating field of view or a fixed field of view.

Embodiments of the present disclosure will be explained with reference to the accompanying drawings.

FIG. 1 illustrates an example embodiment of an autonomous driving system 100 according to at least one embodiment of the present disclosure. The autonomous driving system 100 may include one or more computer systems and/or software modules configured to perform one or more operations involved with driving an autonomous vehicle. Various aspects of the autonomous driving system 100 may be included on-board with the autonomous vehicle itself, or with a remote system in communication with the autonomous vehicle, such as a cloud computing system, a server, or a mobile device. In some embodiments, the autonomous driving system 100 may include sensor drivers and a world engine 102 that is configured to capture and process sensor data relating to an environment in which the autonomous vehicle travels, such as information relating to what objects are present in the environment and where such objects are located relative to the autonomous vehicle. The sensor data related to the autonomous vehicle's environment may be sent to a mapping system 104 to generate a virtual map of the environment. In some embodiments, the virtual map may be sent from the mapping system 104 back to the sensor drivers and world engine 102 to provide a map on which the sensor data relating to environmental objects may be oriented. Additionally or alternatively, the virtual map may provide a map onto which environmental topography may be plotted.

The virtual map of the mapping system 104 may be sent to a localization system 106 and/or a routing system 108. The localization system 106 may provide an estimated location of the autonomous vehicle within the environment and/or the virtual map, and the routing system 108 may compute a route between the estimated location of the autonomous vehicle to a designated destination along a valid path included in the virtual map.

In some embodiments, the sensor data of the sensor drivers and world engine 102 may be sent to a prediction system 110 that is configured to predict movement and/or trajectories of one or more objects in the vicinity of the autonomous vehicle and/or the autonomous vehicle itself. A decision system 112 may obtain the predicted object trajectories from the prediction system 110, and based on a location of the autonomous vehicle as determined by the localization system 106, the decision system 112 may determine one or more driving decisions according to various driving rules. The driving decisions determined by the decision system 112 may be sent to a planning system 114 that processes, parses, and/or queues the driving decisions for a downstream control system 116. In some embodiments, the control system 116 may generate control signals that are obtained by a drive-by-wire system 118 or another actuation system that controls one or more operations of the autonomous vehicle.

In some embodiments, the autonomous driving system 100 may include a visualization system 120 that is configured to obtain information from the sensor drivers and world engine 102, the prediction system 110, the decision system 112, the planning system 114, the control system 116, the drive-by-wire system 118, or any other computer system of the autonomous driving system 100. The visualization system 120 may generate two-dimensional and/or three-dimensional models of the autonomous vehicle, objects in the vicinity of the autonomous vehicle, and/or the environment in which the autonomous vehicle operates. Additionally or alternatively, the visualization system 120 may provide a visual representation of movement and/or predicted trajectories of the autonomous vehicle and/or any of the nearby objects.

In some embodiments, the autonomous driving system 100 may include a diagnostics system 122 that is configured to obtain information from the sensor drivers and world engine 102, the prediction system 110, the decision system 112, the planning system 114, the control system 116, the drive-by-wire system 118, or any other computer system of the autonomous driving system 100. The diagnostics system 122 may run diagnostic tests to assess the accuracy and/or validity of determinations and decisions made by other computer systems of the autonomous driving system 100.

In these and other embodiments, the diagnostics system 122 may be communicatively coupled to a simulations system 124 that provides a virtual environment in which the determinations and decisions made by other computer systems and/or software modules of the autonomous driving system 100 may be simulated to identify any issues with the simulated determinations and decisions. Additionally or alternatively, the simulations system 124 may obtain information from the drive-by-wire system 118 so that the simulations system 124 may run simulations based on control signals implemented by the autonomous vehicle in the real world. The simulations system 124 may virtually determine movements of the autonomous vehicle and/or of one or more objects in the vicinity of the autonomous vehicle. Based on the virtually determined movements, the simulations system 124 may determine updated positions of the autonomous vehicle and/or of the surrounding objects. In some embodiments, the simulations system 124 may provide the virtually determined movements and/or the updated positions to the sensor drivers and world engine 102 so that the total measurable world as represented by the sensor drivers and world engine 102 may be updated based on the simulation results.

In some embodiments, the autonomous driving system 100 may include a fleet management system 126 that obtains information from multiple autonomous vehicles communicatively coupled to the fleet management system 126. The fleet management system 126 may relay information between different autonomous vehicles in communication with the fleet management system 126 to coordinate operations of the multiple autonomous vehicles. In these and other embodiments, a user managing fleet operations may use a mobile app 128 to receive information from and/or send information or commands to a fleet of autonomous vehicles.

Modifications, additions, or omissions may be made to the autonomous driving system 100 without departing from the scope of the present disclosure. For example, the designations of different elements in the manner described is meant to help explain concepts described herein and is not limiting. For instance, in some embodiments, the graphing module 120 and the quadratic computation module 130 are delineated in the specific manner described to help with explaining concepts described herein but such delineation is not meant to be limiting. Further, the autonomous driving system 100 may include any number of other elements or may be implemented within other systems or contexts than those described.

Figure 2A:
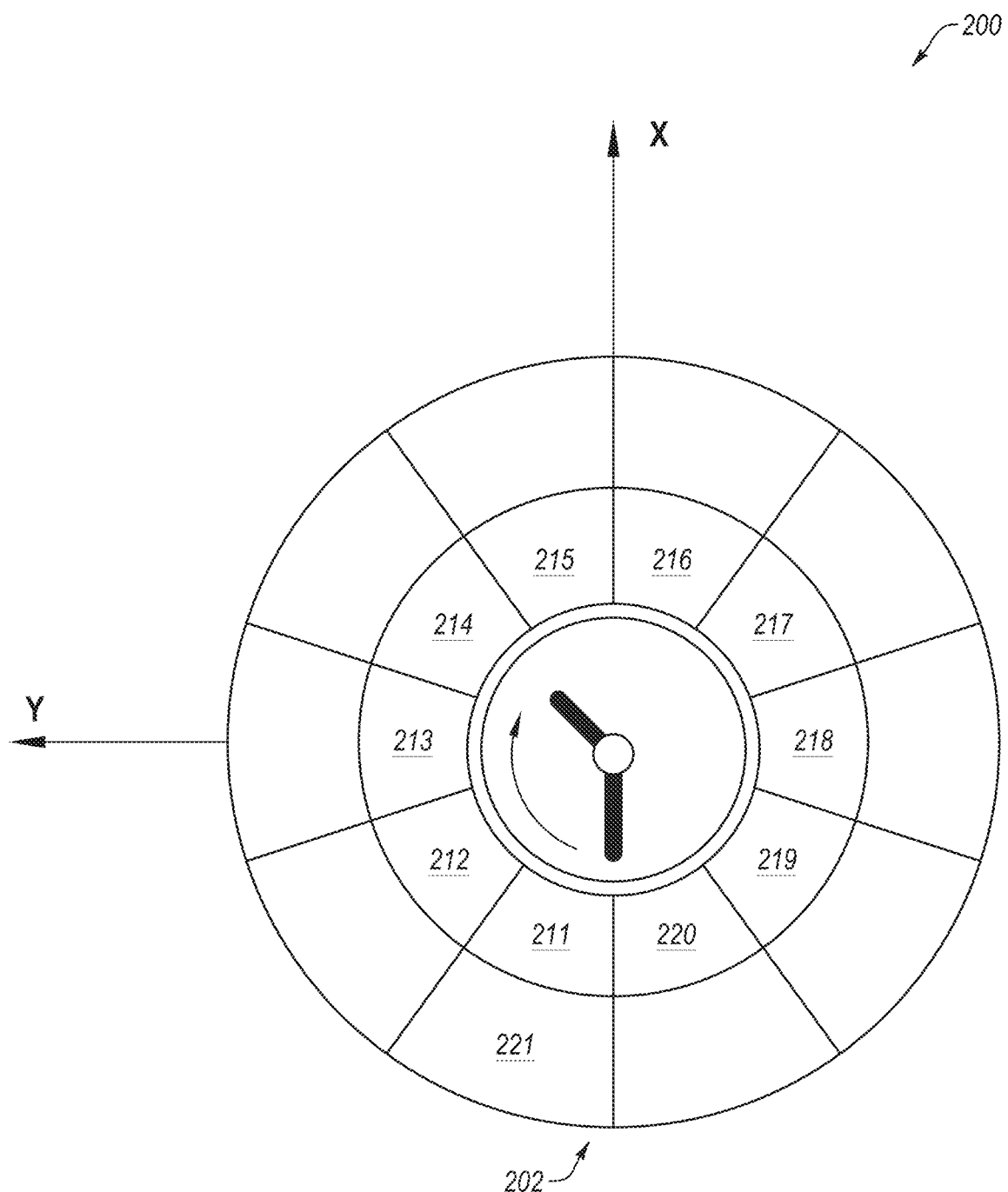
FIG. 2A illustrates a diagram of a LiDAR sensor according to the present disclosure.

FIG. 2A illustrates a diagram of a LiDAR sensor 200 according to the present disclosure. The LiDAR sensor 200 may capture data indicating distances from the LiDAR sensor 200 to one or more objects and/or surfaces (e.g., topography) within a detection range of the LiDAR sensor 200 by revolving a laser beam about a fixed point of the LiDAR sensor 200. In some embodiments, the LiDAR sensor 200 may capture LiDAR data one or more times during a single revolution of the laser beam. For example, a laser beam may complete one revolution every 10 milliseconds (ms), 50 ms, 100 ms, 500 ms, 1 second, or at any other revolution rate and capture LiDAR data once, twice, five times, ten times, fifteen times, or at any other data-capturing frequency during the revolution. As illustrated in FIG. 2A, a given LiDAR sensor 200 may complete one revolution in, for example, 100 ms and capture LiDAR data ten times during the revolution. Thus, the given LiDAR sensor 200 captures a packet of data once every 10 ms over a 36° arc revolution starting from a first arc 211 through a second arc 212 and eventually a tenth arc 220 of the laser beam, with each packet of data captured by the given LiDAR sensor 200 covering a successive arc 211-220 around a 360° revolution, which would be repeated after every tenth segment as the laser continues to revolve around the 360° revolution again with an eleventh arc 221.

Figure 2B:
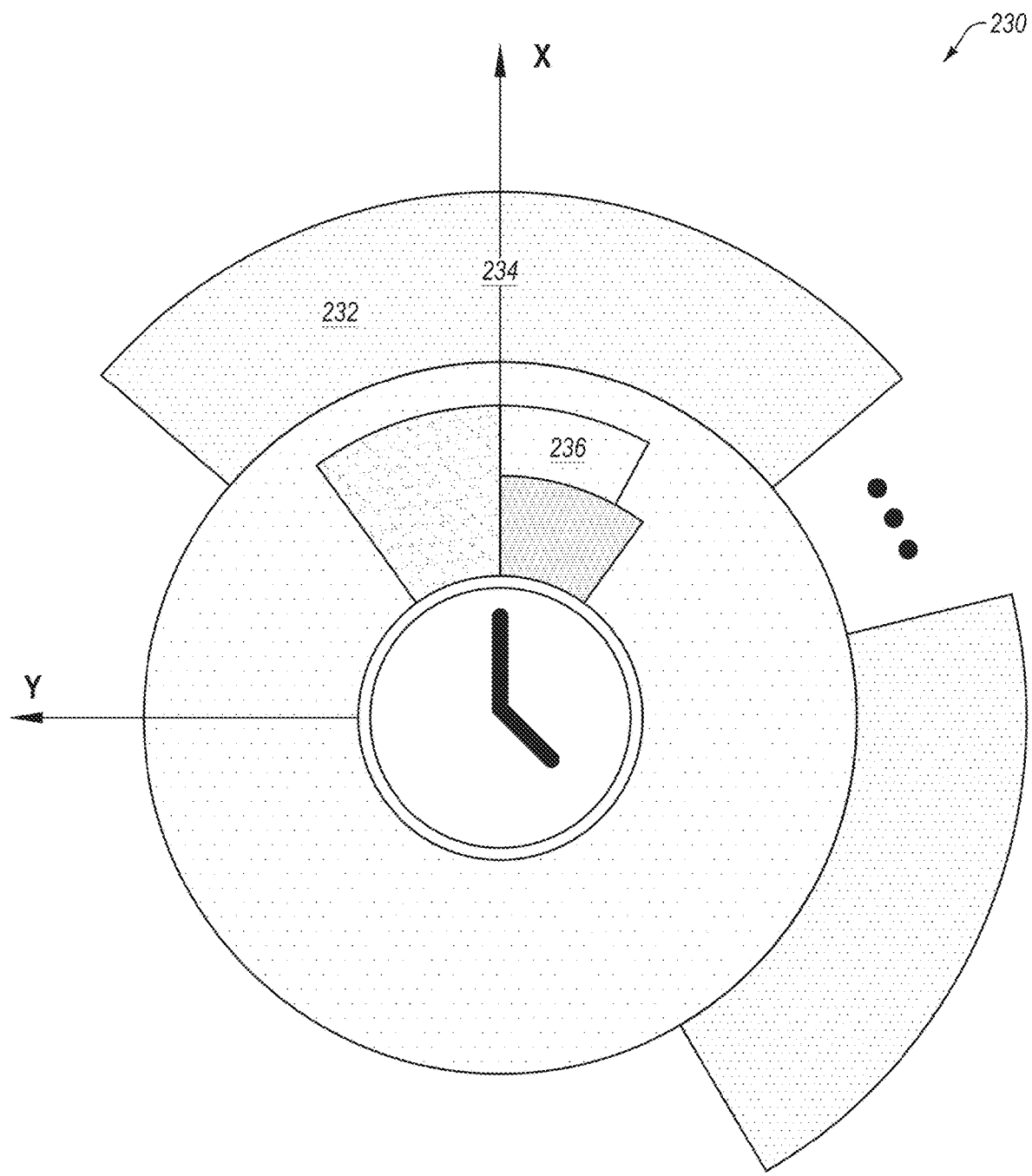
FIG. 2B illustrates an image-capturing sensor according to the present disclosure.

FIG. 2B illustrates an image-capturing sensor 230 (e.g., a camera sensor) according to at least one embodiment of the present disclosure. The image-capturing sensor may include a fixed orientation and a fixed horizontal field of view angle 232. As such, image data captured by the image-capturing sensor 230 may be asynchronous with some of the LiDAR data captured by the LiDAR sensor 200 having a center of revolution positioned approximate a center of the image-capturing sensor 230. The fixed horizontal field of view angle 232 is visually overlaid on the LiDAR sensor field of view 240 in FIG. 2B.

In some embodiments, the horizontal field of view 232 of the image-capturing sensor 230 may be less than a revolution angle of the LiDAR sensor 200 (e.g., less than 360°). Additionally or alternatively, the image-capturing sensor 230 may include a shutter period 240 during which the image-capturing sensor 230 is unable to capture image data due to shuttering of an aperture of the image-capturing sensor 230. The shutter period 236 of the image-capturing sensor 230 may be adjusted such that a threshold amount of light is captured by the image-capturing sensor 230 to improve the quality of the image data. For example, in some circumstances, the image-capturing sensor 230 may include a faster shutter speed corresponding to a smaller shutter period in environments with high ambient light (e.g., during the day or in full sun) and a slower shutter speed corresponding to a longer shutter period in environments with low ambient light (e.g., during the night or in shady conditions such as in tunnels, on wooded roads, etc.). Because of the shutter period 236, which may be variable, the LiDAR sensor 200 may capture LiDAR data during periods of time in which the image-capturing sensor 230 is unable to capture image data. For example, if both the LiDAR sensor 200 and the image-capturing sensor 230 are triggered at the same time, there may be a mismatch in what data is visualized due to the image-capturing sensor 230 being unavailable at the trigger time because of a slower shutter speed. Additionally or alternatively, the LiDAR data may be misaligned or difficult to align with the image data because of the time variability associated with the image capture. Additionally or alternatively, the LiDAR data captured by the LiDAR sensor 200 may be captured from a different horizontal field of view than the horizontal field of view 232 from which the image-capturing sensor 230 captures image data. For example, the LiDAR sensor 200 may be capturing data in the arc 212 based on its rotation while the image-capturing sensor 230 is capturing data in the arcs 214-217.

In some embodiments, the timing with which the image-capturing sensor 230 captures image data may be delayed such that the LiDAR sensor 200 and the image-capturing sensor 230 capture data from the same or a similar angle. An alignment time used for alignment of the orientation of the LiDAR sensor 200 with the orientation of the image-capturing sensor 230, $t_{rotate}$, may be calculated based on the following relationship:

$$t_{rotate} = \theta/\omega \qquad (1)$$

in which θ represents an angle between a zero-crossing point 202 of the LiDAR sensor 200 and a center 234 of the horizontal field of view 232 of the image-capturing sensor 230 and ω represents an angular velocity of the laser beam of the LiDAR sensor 200. The zero-crossing point 202 of the LiDAR sensor 200 may represent a point at which the laser beam of the LiDAR sensor 200 first begins collecting LiDAR data during a given revolution anywhere within the field of view 232 of the image-capturing sensor 230. Stated another way, $t_{rotate}$ may represent the amount of time it takes the LiDAR sensor 200 to rotate from the zero-crossing point 202 to the center 234 of the horizontal field of view 232 of the image-capturing sensor 230. In some embodiments, $t_{rotate}$ may be determined based on the center 234 instead of the zero-crossing point 202.

Based on the alignment time, a delay timing, $t_{sleep}$, with which the image-capturing sensor 230 may delay capturing image data may be determined. In some embodiments, the image-capturing sensor 230 may delay capturing image data according to the delay timing such that the timing with which the image-capturing sensor 230 captures image data synchronizes with the timing with which the LiDAR sensor 200 captures LiDAR data from the same or a similar horizontal field of view. As such, the delay timing may take into consideration the alignment time, a packet-capture timing of the LiDAR sensor 200, and/or the shutter period of the image-capturing sensor 230. In these and other embodiments, the delay timing, $t_{sleep}$, may be calculated according to the following relationship:

$$t_{sleep} = t_{rotate} - \left(\sum_{i=1}^{4} t_i + \frac{t_5}{2}\right) \quad (2)$$

in which $t_i$ represents a time corresponding to capturing a packet of LiDAR data and $t_5$ represents an average frame exposure duration for capturing image data. The alignment time, $t_{rotate}$, may provide a quantitative value that indicates a delay that improves angular alignment between the horizontal field of view 232 of the image-capturing sensor 230 and the zero-crossing point of the LiDAR sensor 200, while the packet-capture timing, represented by $\sum_{i=1}^{4} t_i$, and the average frame exposure duration, represented by $$\frac{t_5}{2},$$

may provide a quantitative value that improves timing alignment of data capture between the LiDAR sensor 200 and the image-capturing sensor 230. Stated another way, the delay timing, $t_{sleep}$, may represent the time it takes for the LiDAR sensor to rotate around to the zero crossing point 202 offset by software/hardware delays and/or delays due to shutter speeds.

In some embodiments, the time corresponding to capturing a packet of LiDAR data may include one or more time components related to communication of the packet of LiDAR data to one or more components of a LiDAR-camera synchronization system, such as a LiDAR-camera synchronization system 300 as described below in relation to FIG. 3.

In some embodiments, the average frame exposure duration may be calculated as:

$$t_5 = \frac{\sum_{i=1}^{N} t_{5i}}{N} \quad (3)$$

in which $t_{5i}$ represents the frame exposure duration corresponding to an image captured by the image-capturing sensor 230. Averaging the frame exposure duration to determine $t_5$ may improve the accuracy of the delay timing because the frame exposure duration may change during operation of the LiDAR-camera synchronization system in response to changes in ambient lighting conditions, which may be caused by driving through different amounts of shade, during sunset or sunrise, and/or during shifting weather patterns.

In some embodiments, the accuracy of the synchronization may be monitored and or analyzed. A synchronization error may be determined to provide a time period for a correction window for the synchronization of the LiDAR sensor 200 and the image-capturing sensor 230. In these and other embodiments, the synchronization error, $t_{error}$, may be calculated for each revolution of the LiDAR sensor 200 and/or each image captured by the image-capturing sensor 230 based on an initial estimated synchronization time, $t_{estimated}$, and an actual synchronization time, $t_1$, related to the timings with which the LiDAR sensor 200 and the image-capturing sensor 230 capture sensor data. In some embodiments, the initial estimated synchronization time may include a previously known synchronization time corresponding to the delay timing of the LiDAR-camera synchronization system. In these and other embodiments, the synchronization error may be represented as:

$$t_{error} = |t_{estimated} - t_1| \quad (4)$$

In some embodiments, an average synchronization error, $t_{error-avg}$, and/or a variance in synchronization error, $t_{error-variance}$, may be calculated to assess the stability of synchronization between the LiDAR sensor 200 and the image-capturing sensor 230. The average synchronization error may be represented as:

$$t_{error-avg} = \frac{\sum_{i=1}^{N} t_{error}}{N} \quad (5)$$

Additionally or alternatively, the variance in synchronization error may be represented as:

$$t_{error-variance} = \left(\sum_{i=1}^{N} \frac{(t_{error})^2}{N} - (t_{error-avg})^2\right) * \frac{N}{N-1} \quad (6)$$

In these and other embodiments, a low average synchronization error may indicate that the LiDAR sensor 200 and the image-capturing sensor 230 are largely synchronized during a given revolution, and the quality of paired LiDAR-image data may be high. Additionally or alternatively, a high variance value may indicate the sensor data captured by the LiDAR sensor 200 and the image-capturing sensor 230 are not paired together in terms of timing and/or angular alignment.

Figure 2C:
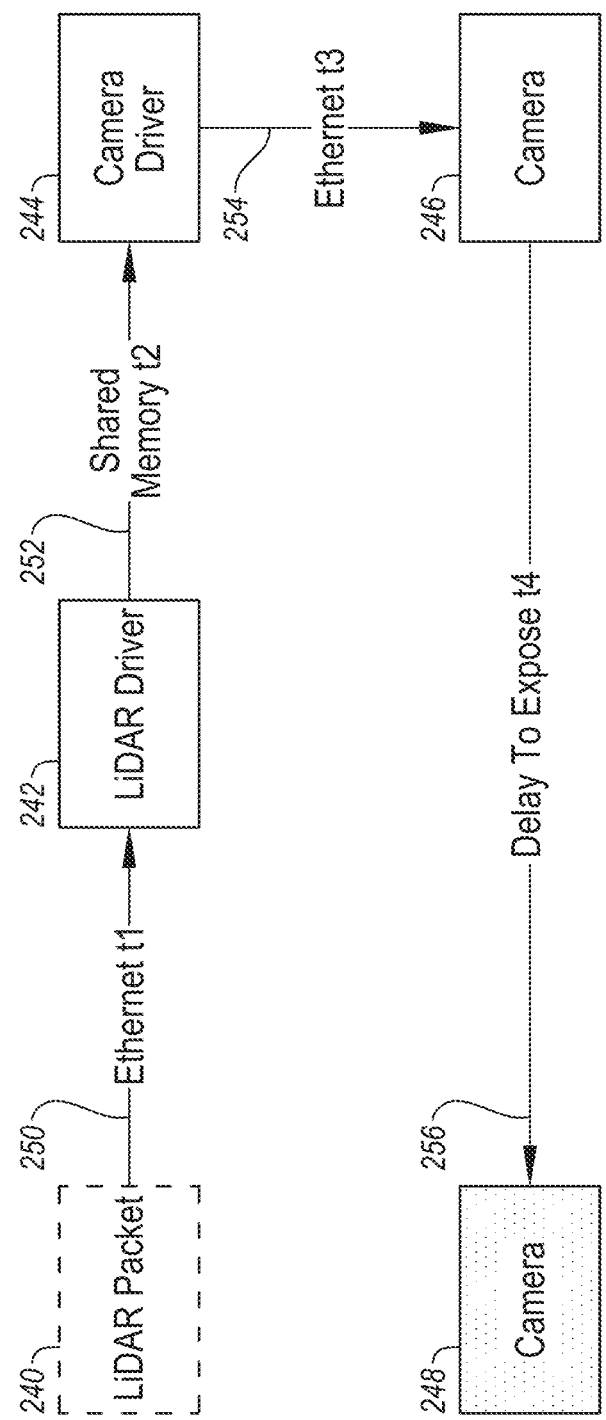
FIG. 2C illustrates an example diagram of a time delay between capture of a packet of LiDAR data and capture of a packet of image data.

FIG. 2C illustrates an example diagram of time-delay components 250, 252, 254, and 256 between data packet processing checkpoints 240, 242, 244, 246, and 248, starting from a first checkpoint 240 relating to capture of a packet of LiDAR data and a fifth checkpoint 248 relating to capture of a packet of image data. As illustrated in FIG. 2C, a packet of LiDAR data may be captured as the first checkpoint 240 and sent from the LiDAR sensor that captured the packet to a LiDAR driver as a second checkpoint 242 with a first time-delay 250, $t_1$, between the first checkpoint 240 and the second checkpoint 242 representative of the amount of time it takes for the LiDAR data to travel over a network connection, such as a hard-wired network connection, between the LiDAR sensor and the LiDAR driver. A second time-delay 252, $t_2$, may be monitored between the second checkpoint 242 and a third checkpoint 244 to represent a duration of time taken to share the packet of LiDAR data from the LiDAR driver to a camera driver via a shared memory between the LiDAR driver and the camera driver. The camera driver at the third checkpoint 244 may communicate to a camera sensor at a fourth checkpoint 246 that the packet of LiDAR data has been received, which may involve a third time-delay 254, $t_3$, and the camera sensor at the fourth checkpoint 246 may initiate data capture at the fifth checkpoint 248, with a fourth time-delay 256, $t_4$ that elapses before the camera performs the data capture. In these and other embodiments, the number of time-delay components included may be greater than or less than the number of time-delay components illustrated in FIG. 2C because a given LiDAR-camera synchronization system may include more or fewer components than the LiDAR-camera synchronization system described in relation to FIG. 2C. Additionally or alternatively, various checkpoints may be combined or expanded. For example, the second time-delay 252 may be expanded to include a first portion corresponding to how long it takes to write the LiDAR data to the shared memory, and a second portion corresponding to how long it takes for the camera driver to read the data from the shared memory.

Figure 3:
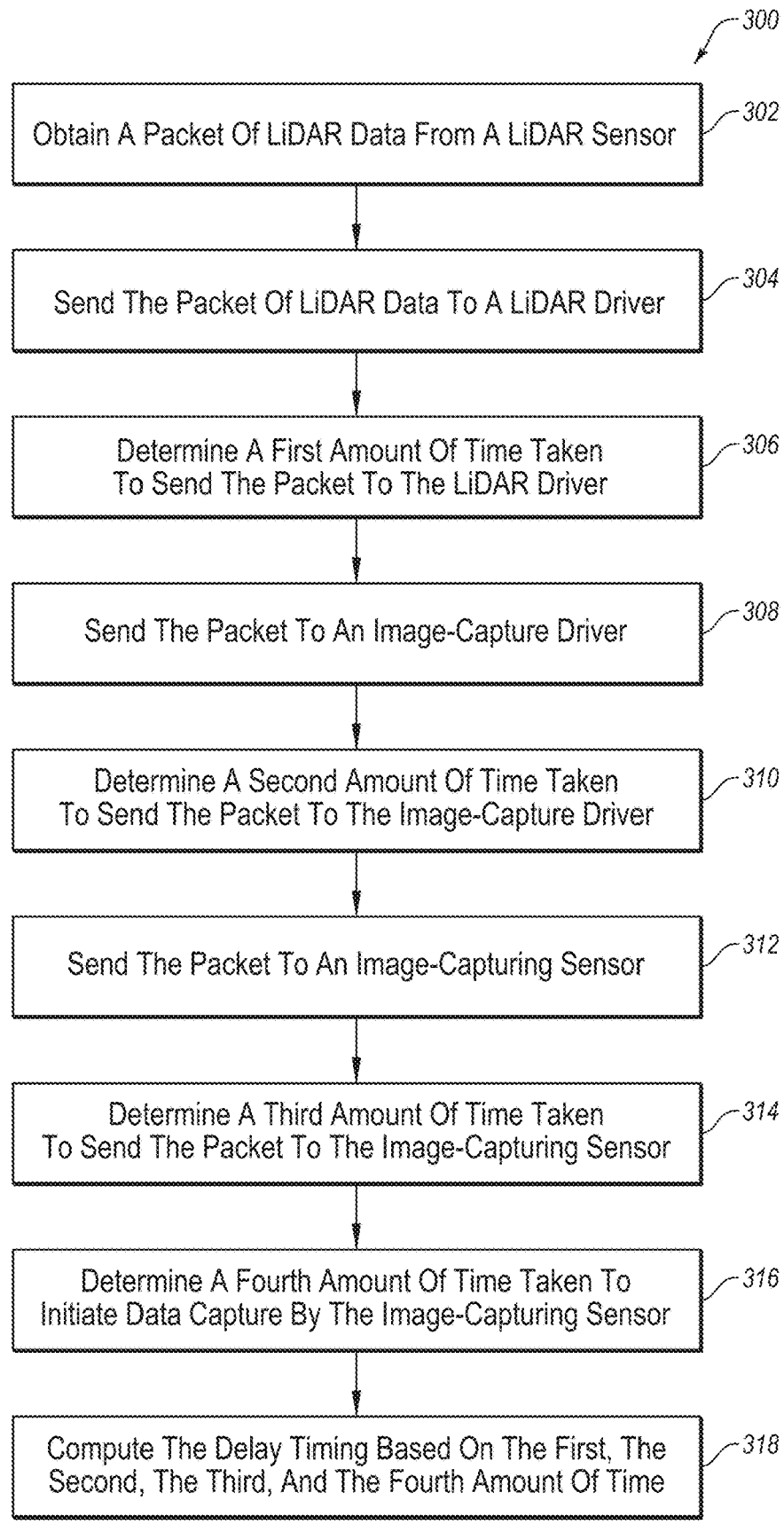
FIG. 3 is a flowchart of an example method of determining a delay timing for initiating data capture for a LiDAR-camera synchronization system that includes time-delay components included in the LiDAR-camera synchronization system 400 of FIG. 4 according to at least one embodiment of the present disclosure.
Figure 4:
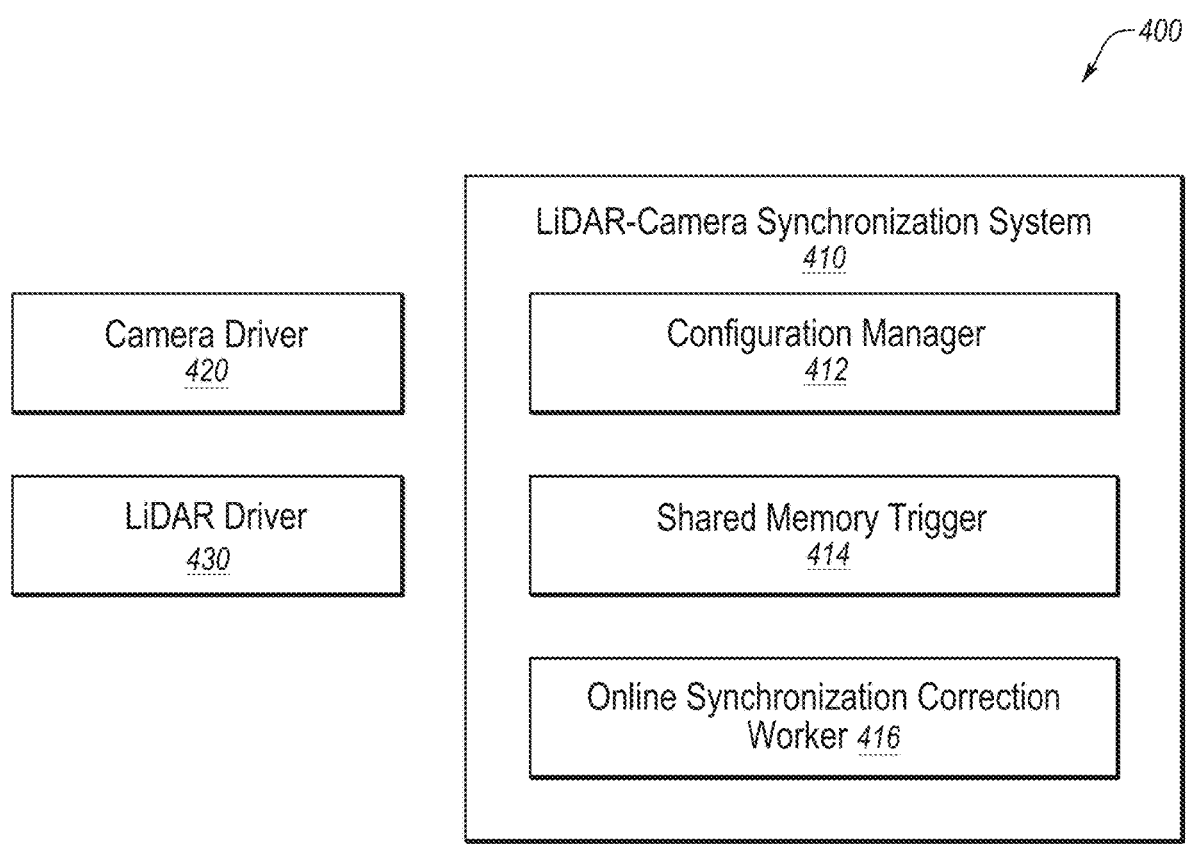
FIG. 4 illustrates a diagram of a LiDAR-camera synchronization system according to the present disclosure.

FIG. 3 is a flowchart of an example method 300 of determining a packet-capture timing involved with the delay timing for initiating data capture of a LiDAR-camera synchronization system that includes the time-delay components 250, 252, 254, and 256, such as the LiDAR-camera synchronization system 400 of FIG. 4, according to at least one embodiment of the present disclosure. In some embodiments, the packet-capture timing may be included in the calculation for the delay timing, and as described in Equation (2), the packet-capture timing may be represented by $\Sigma_{i=1}^{4} t_i$. The method 300 may be performed by any suitable system, apparatus, or device. For example, the computing system 400 and/or components thereof such as the LiDAR-camera synchronization system 410, the camera driver 420, and/or the LiDAR driver 430 of FIG. 4, may perform one or more operations associated with the method 300. Although illustrated with discrete blocks, the steps and operations associated with one or more of the blocks of the method 300 may be divided into additional blocks, combined into fewer blocks, or eliminated, depending on the particular implementation.

The method 300 may begin at block 302, where a packet of LiDAR data is obtained from a LiDAR sensor. Because the delay timing between data capture by the LiDAR sensor and data capture by an image-capturing sensor may be based on the initiation of data capture by each of the two sensors, a time-delay component may or may not be associated with obtaining the packet of LiDAR data by the LiDAR sensor.

At block 304, the packet of LiDAR data may be sent to a LiDAR driver. For example, the packet may be communicated over a hard-wired network, such as an Ethernet network.

At block 306, a first amount of time taken to send the packet of LiDAR data to the LiDAR driver may be determined. The first amount of time may indicate a communication time and/or a communication latency between the LiDAR sensor and the LiDAR driver.

At block 308, the packet of LiDAR data may be sent to an image-capture driver, which may be associated with the image-capturing sensor.

At block 310, a second amount of time taken to send the packet of LiDAR data from the LiDAR driver to the image-capture driver may be determined. In some embodiments, the LiDAR driver and the image-capture driver may be communicatively coupled via shared memory, and the second amount of time may indicate a communication time and/or a communication latency between the LiDAR driver and the image-capture driver over the shared memory. If the LiDAR driver and the image-capture driver are not communicatively coupled over shared memory, the second amount of time may or may not increase depending on the modality of communication of data between the two drivers, which may or may not take a longer amount of time.

At block 312, the packet of LiDAR data may be sent from the image-capture driver to the image-capturing sensor.

At block 314, a third amount of time taken to send data communication to the image-capturing sensor that the packet of LiDAR data was received by the image-capture driver may be determined. The third amount of time may indicate a communication time and/or a communication latency between the image-capture driver and the image-capturing sensor.

At block 316, a fourth amount of time taken to initiate data capture by the image-capturing sensor may be determined. In some embodiments, the fourth amount of time may indicate a latency between reception of the communication indicating reception of the packet of LiDAR data by the image capture driver and initiating data capture by the image-capturing sensor. Additionally or alternatively, the fourth amount of time may include a latency associated with a shutter duration of an image-capturing sensor such that the fourth amount of time may represent a time between reception of the communication indicating reception of the packet of LiDAR data by the image capture driver and the actual capture of the image data.

At block 318, the packet-capture timing (which may be used in determining the overall delay timing) may be computed based on the first, the second, the third, and/or the fourth amounts of time. In some embodiments, the delay timing may be computed according to Equation (2) described in relation to FIGS. 2A, 2B, and 2C in which the first, the second, the third, and the fourth amounts of time described in relation to blocks 304, 306, 308, 310, 312, and 314 relate to the packet-capture timing. As such, the delay timing may be computed based on an alignment time as offset by the determined packet-capture timing and/or an average frame exposure duration.

Modifications, additions, or omissions may be made to the method 300 without departing from the scope of the disclosure. For example, the designations of different elements in the manner described is meant to help explain concepts described herein and is not limiting. Further, the method 300 may include any number of other elements or may be implemented within other systems or contexts than those described.

FIG. 4 illustrates an example diagram of a computer system 400 that includes a LiDAR-camera synchronization system 410 according to at least one embodiment of the present disclosure. The LiDAR-camera synchronization system 410 may include a configuration manager 412, a shared memory trigger 414, and/or an online synchronization correction worker 416. In some embodiments, the configuration manager 412 may facilitate communication with one or more camera drivers 420 and/or one or more LiDAR drivers 430 in which the camera drivers 420 and/or the LiDAR drivers 430 may be configured to facilitate transmission of image data and/or LiDAR data, respectively, to the configuration manager 412 of the LiDAR-camera synchronization system 400.

The shared memory trigger 414 may include code and routines configured to enable the computer system 400 to perform one or more operations. Additionally or alternatively, the shared memory trigger 414 may be implemented using hardware including a processor, a microprocessor (e.g., to perform or control performance of one or more operations), a field-programmable gate array (FPGA), or an application-specific integrated circuit (ASIC). The shared memory trigger 414 may be configured to perform a series of operations with respect to the LiDAR data and/or the image data. For example, the shared memory trigger 414 may be configured to process the LiDAR data and/or the image data to determine the alignment timing, the average frame exposure timing, and/or the delay timing as described above in relation to Equations (1) through (3).

In some embodiments, the online synchronization correction worker 416 may include code and routines configured to enable the computer system 400 to perform one or more operations. Additionally or alternatively, the online synchronization correction worker 416 may be implemented using hardware including a processor, a microprocessor (e.g., to perform or control performance of one or more operations), a field-programmable gate array (FPGA), or an application-specific integrated circuit (ASIC). The online synchronization correction worker 416 may be configured to perform a series of operations with respect to synchronization of the LiDAR data and/or the image data. For example, the online synchronization correction worker 416 may be configured to process the LiDAR data, the image data, the alignment timing, the average frame exposure timing, and/or the delay timing to determine the synchronization error, the average synchronization error, and/or the variance in the synchronization error as described above in relation to Equations (4) through (6).

Figure 5B:
FIG. 5B illustrates an overlay of LiDAR data captured by the LiDAR sensor and image data captured by the image-capturing sensor after synchronization of the LiDAR data and the image data according to the present disclosure.

Modifications, additions, or omissions may be made to the computer system 400 without departing from the scope of the present disclosure. For example, the designations of different elements in the manner described is meant to help explain concepts described herein and is not limiting. For example, in some embodiments, the LiDAR-camera synchronization system 410, the configuration manager 412, the shared memory trigger 414, the online synchronization correction worker 416, the camera drivers 420, and/or the LiDAR drivers 430 are delineated in the specific manner described to help with explaining concepts described herein but such delineation is not meant to be limiting and all may be implemented in a single physical device. As another example, the computer system 400 may include any number of other elements or may be implemented within other systems or contexts than those described FIG. 5A illustrates an environment 500 that includes an overlay of LiDAR data captured by a LiDAR sensor and image data captured by an image-capturing sensor before synchronization of the LiDAR data and the image data. As illustrated in FIG. 5A, horizontal lines 505 representing the LiDAR data may be correlated to a ground surface, topographical changes in the ground surface, and/or one or more objects included in the image data. FIG. 5B illustrates a second environment 510 that includes an overlay of LiDAR data captured by the LiDAR sensor and image data captured by the image-capturing sensor after synchronization of the LiDAR data and the image data according to the present disclosure. The synchronization of the LiDAR data and the image data may improve the correlation between the LiDAR data and the image data such that horizontal lines 515 representing the LiDAR data after synchronization better track the ground surface, the topographical changes in the ground surface, and/or the objects included in the image data.

Figure 6:
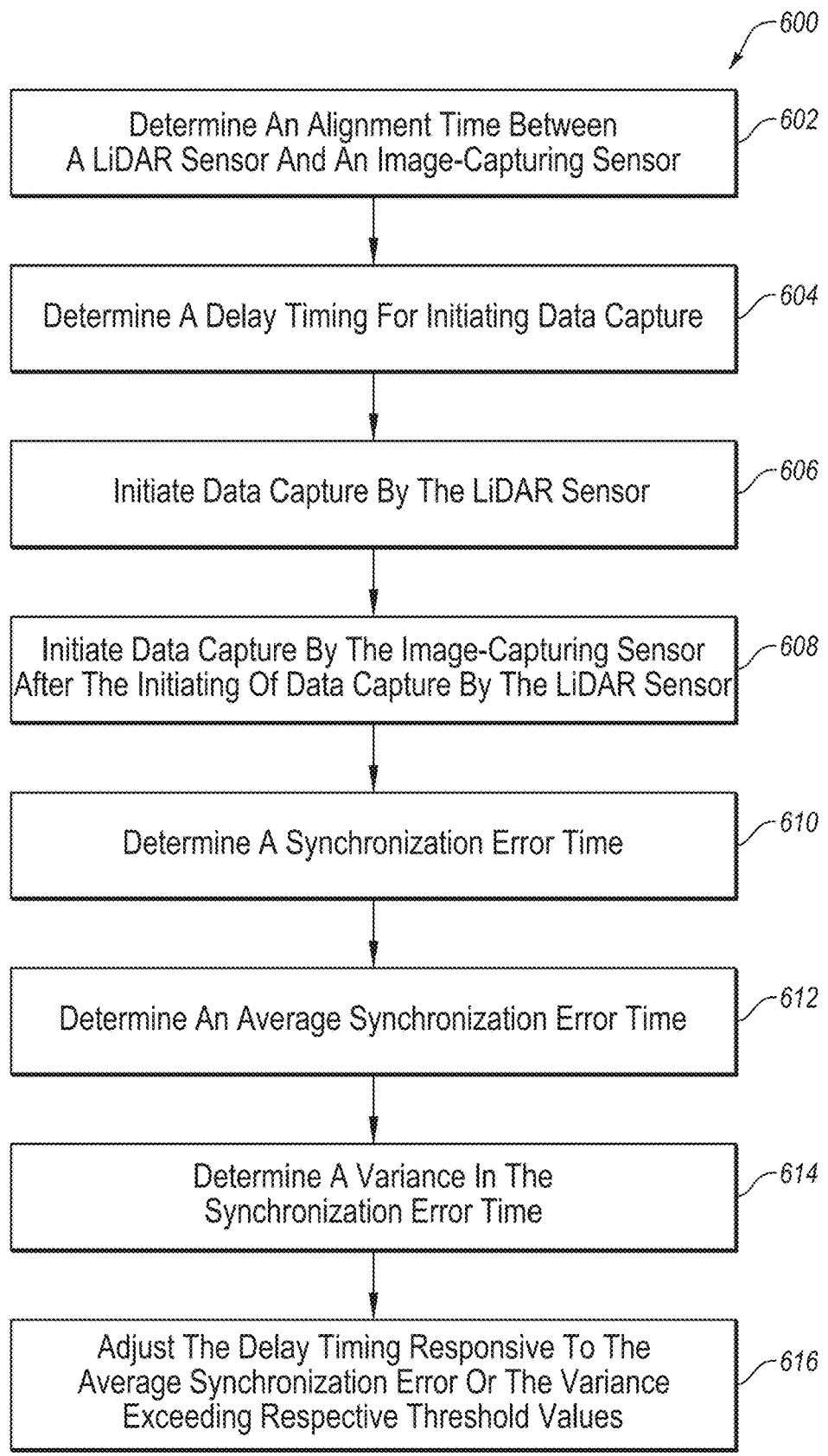
FIG. 6 is a flowchart of an example method of synchronizing data capture for a LiDAR-camera synchronization system according to at least one embodiment of the present disclosure.

FIG. 6 is a flowchart of an example method 600 of synchronizing data capture for a LiDAR-camera synchronization system, such as the LiDAR-camera synchronization system 400 of FIG. 4, according to at least one embodiment of the present disclosure. The method 600 may be performed by any suitable system, apparatus, or device. For example, the computing system 400 and/or components thereof such as the LiDAR-camera synchronization system 410, the camera driver 420, and/or the LiDAR driver 430 of FIG. 4, may perform one or more operations associated with the method 600. Although illustrated with discrete blocks, the steps and operations associated with one or more of the blocks of the method 600 may be divided into additional blocks, combined into fewer blocks, or eliminated, depending on the particular implementation.

The method 600 may begin at block 602, where an alignment time based on a zero-crossing point corresponding to a LiDAR sensor and a horizontal field of view corresponding to an image-capturing sensor may be determined. The alignment time may indicate how long it takes for a field of view of the LiDAR sensor to align with the horizontal field of view of the image-capturing sensor if the LiDAR sensor and the image-capturing sensor began capturing data at the same time. In some embodiments, the alignment time may be computed using Equation (1) based on an angle difference between the zero-crossing point of the LiDAR sensor and the horizontal field of view of the image-capturing sensor and an angular velocity of a laser beam of the LiDAR sensor.

At block 604, a delay timing for initiating data capture by the image-capturing sensor may be determined. In some embodiments, the delay timing may be determined using the method 300 as described in relation to FIG. 3.

At block 606, data capture by the LiDAR sensor may be initiated.

At block 608, data capture by the image-capturing sensor may be initiated after a length of time corresponding to the delay timing has passed after initiation of data capture by the LiDAR sensor. By initiating data capture by the image-capturing sensor after waiting a length of time corresponding to the delay timing, the fields of view of the LiDAR sensor and the image-capturing sensor may be better aligned such that the LiDAR data captured by the LiDAR sensor better correlates to the image data captured by the image-capturing sensor.

At block 610, a synchronization error time may be determined. The synchronization error time may be a period of time representing a correction window for synchronization of the LiDAR sensor and the image-capturing sensor. In some embodiments, the delay timing determined at block 604 may be adjusted based on the synchronization error time, which may result in a longer or a shorter delay timing. Additionally or alternatively, the cadence of rotation of the LiDAR sensor may be changed, a shutter speed of the image-capturing sensor may be changed, or any other factor in the delay timing such that the synchronization error time may be decreased.

At block 612, an average synchronization error time may be determined. The average synchronization error time may provide an indicator of how well the LiDAR sensor and the image-capturing sensor are synchronized during a given revolution by computing a running average of the synchronization error time over a number of revolutions. A low average synchronization error time may indicate that the quality of paired LiDAR-image data may be high, while a high average synchronization error time may indicate that the quality of paired LiDAR-image data may be poor. In some embodiments, the average synchronization error time may be determined using Equation (5).

At block 614, a variance in the synchronization error time may be determined. The variance in the synchronization error time may provide an indicator of how stable the synchronization of the LIDAR data captured by the LiDAR sensor and the image data captured by the image-capturing sensor is with high variance indicating that the sensor data captured by the two sensors are not paired together precisely in terms of timing and/or angular alignment. In some embodiments, the variance in the synchronization error time may be determined using Equation (6).

At block 616, the delay timing may be adjusted responsive to the average synchronization error time and/or the variance exceeding a first threshold value and/or a second threshold value, respectively. For example, the delay timing may be adjusted, such as by recomputing the delay timing and/or modifying the delay timing based on the average synchronization error time, responsive to the average synchronization error time exceeding a first threshold value because an average synchronization error time above the first threshold value may indicate that the delay timing does not properly synchronize the initiation of data capture by the LiDAR sensor and the image-capturing sensor. As another example, the delay timing may be adjusted responsive to the variance in the synchronization error time exceeding a second threshold value, which may indicate that there is a significant discrepancy between data captured by the LiDAR sensor and the image-capturing sensor.

Modifications, additions, or omissions may be made to the method 600 without departing from the scope of the disclosure. For example, the designations of different elements in the manner described is meant to help explain concepts described herein and is not limiting. Further, the method 600 may include any number of other elements or may be implemented within other systems or contexts than those described.

Figure 7:
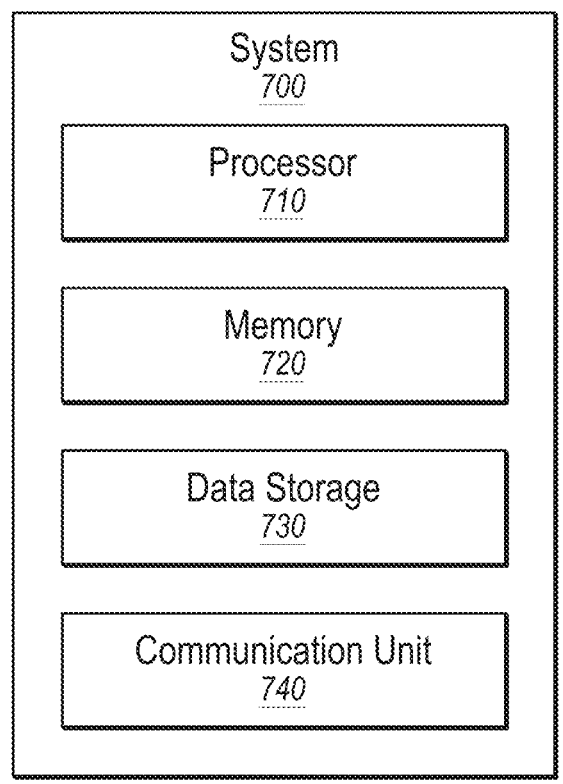
FIG. 7 is an example computing system.

FIG. 7 illustrates an example computing system 700, according to at least one embodiment described in the present disclosure. The computing system 700 may include a processor 710, a memory 720, a data storage 730, and/or a communication unit 740, which all may be communicatively coupled. Any or all of the system 400 of FIG. 4 may be implemented as a computing system consistent with the computing system 700, including the camera driver, the configuration manager, the shared memory trigger, and/or the online synchronization correction worker.

Generally, the processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 7, it is understood that the processor 710 may include any number of processors distributed across any number of network or physical locations that are configured to perform individually or collectively any number of operations described in the present disclosure. In some embodiments, the processor 710 may interpret and/or execute program instructions and/or process data stored in the memory 720, the data storage 730, or the memory 720 and the data storage 730. In some embodiments, the processor 710 may fetch program instructions from the data storage 730 and load the program instructions into the memory 720.

After the program instructions are loaded into the memory 720, the processor 710 may execute the program instructions, such as instructions to perform operations associated with the camera driver, the configuration manager, the shared memory trigger, and/or the online synchronization correction worker.

The memory 720 and the data storage 730 may include computer-readable storage media or one or more computer-readable storage mediums for having computer-executable instructions or data structures stored thereon. Such computer-readable storage media may be any available media that may be accessed by a general-purpose or special-purpose computer, such as the processor 710. For example, the memory 720 and/or the data storage 730 may store obtained LiDAR sensor data, image data, and/or synchronized LiDAR-image data. In some embodiments, the computing system 700 may or may not include either of the memory 720 and the data storage 730.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication unit 740 may include any component, device, system, or combination thereof that is configured to transmit or receive information over a network. In some embodiments, the communication unit 740 may communicate with other devices at other locations, the same location, or even other components within the same system. For example, the communication unit 740 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 740 may permit data to be exchanged with a network and/or any other devices or systems described in the present disclosure. For example, the communication unit 740 may allow the system 700 to communicate with other systems, such as computing devices and/or other networks.

One skilled in the art, after reviewing this disclosure, may recognize that modifications, additions, or omissions may be made to the system 700 without departing from the scope of the present disclosure. For example, the system 700 may include more or fewer components than those explicitly illustrated and described.

The embodiments described in the present disclosure may include the use of a special purpose or general-purpose computer including various computer hardware or software modules. Further, embodiments described in the present disclosure may be implemented using computer-readable media for having computer-executable instructions or data structures stored thereon.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   determining an alignment time based on a zero-crossing point corresponding to a LiDAR sensor and a horizontal field of view corresponding to an image-capturing sensor;
   determining a delay timing for initiating image capturing by the image-capturing sensor in which the delay timing is based on at least one of: the alignment time, a packet capture timing corresponding to the LiDAR sensor, and an average frame exposure duration corresponding to the image-capturing sensor;
   initiating data capture by the LiDAR sensor;
   initiating data capture by the image-capturing sensor in conjunction with the initiating of data capture by the LiDAR sensor, wherein the initiating of data capture by the image-capturing sensor occurs after the delay timing has elapsed;
   determining a synchronization error time, wherein the synchronization error time is a period of time corresponding to a correction window for synchronization of the LiDAR sensor and the image-capturing sensor and the delay timing is based on the synchronization error time;
   determining an average synchronization error time; and
   adjusting the delay timing responsive to the average synchronization error time exceeding a first threshold value.

2. The method of claim 1, wherein the packet capture timing corresponding to the LiDAR sensor includes at least one of: a first time delay between capture of a packet of LiDAR data and sending of the packet to a LiDAR driver, a second time delay between reception of the packet by the LiDAR driver and sending of the packet to an image-capturing driver, a third time delay between reception of the packet by the image-capturing driver and sending of the packet to the image-capturing sensor, and a fourth time delay between reception of the packet by the image-capturing sensor and prompting the image-capturing sensor to capture image data.

3. The method of claim 1, wherein the average frame exposure durations corresponding to the image-capturing sensor is a running average of two or more of the most recent frame exposure durations.

4. The method of claim 1, further comprising:
   determining a variance in the synchronization error time; and
   adjusting the delay timing responsive to the variance in the synchronization error time exceeding a second threshold value.

5. The method of claim 1, wherein the image-capturing sensor is a camera.

6. One or more non-transitory computer-readable storage media configured to store instructions that, in response to being executed, cause the system to perform operations, the operations comprising:
   determining an alignment time based on a zero-crossing point corresponding to a LiDAR sensor and a horizontal field of view corresponding to an image-capturing sensor;
   determining a delay timing for initiating image capturing by the image-capturing sensor in which the delay timing is based on at least one of: the alignment time, a packet capture timing corresponding to the LiDAR sensor, and an average frame exposure duration corresponding to the image-capturing sensor;
   initiating data capture by the LiDAR sensor;
   initiating data capture by the image-capturing sensor in conjunction with the initiating of data capture by the LiDAR sensor, wherein the initiating of data capture by the image-capturing sensor occurs after the delay timing has elapsed;
   determining a synchronization error time, wherein the synchronization error time is a period of time corresponding to a correction window for synchronization of the LiDAR sensor and the image-capturing sensor and the delay timing is based on the synchronization error time;

determining an average synchronization error time; and adjusting the delay timing responsive to the average synchronization error time exceeding a first threshold value.

7. The one or more non-transitory computer-readable storage media of claim 6, wherein the packet capture timing corresponding to the LiDAR sensor includes at least one of: a first time delay between capture of a packet of LiDAR data and sending of the packet to a LiDAR driver, a second time delay between reception of the packet by the LiDAR driver and sending of the packet to an image-capturing driver, a third time delay between reception of the packet by the image-capturing driver and sending of the packet to the image-capturing sensor, and a fourth time delay between reception of the packet by the image-capturing sensor and prompting the image-capturing sensor to capture image data.

8. The one or more non-transitory computer-readable storage media of claim 6, wherein the average frame exposure durations corresponding to the image-capturing sensor is a running average of two or more of the most recent frame exposure durations.

9. The one or more non-transitory computer-readable storage media of claim 6, wherein the operations further comprise:

determining a variance in the synchronization error time; and adjusting the delay timing responsive to the variance in the synchronization error time exceeding a second threshold value.

10. The one or more non-transitory computer-readable storage media of claim 6, wherein the image-capturing sensor is a camera.

11. A system, comprising:

one or more processors;

a LiDAR sensor;

an image-capturing sensor coupled to the LiDAR sensor at the same position as the LiDAR sensor; and one or more non-transitory computer-readable storage media configured to store instructions that, in response to being executed, cause the system to perform operations, the operations comprising:

determining an alignment time based on a zero-crossing point corresponding to a LiDAR sensor and a horizontal field of view corresponding to an image-capturing sensor;

determining a delay timing for initiating image capturing by the image-capturing sensor in which the delay timing is based on at least one of: the alignment time, a packet capture timing corresponding to the LiDAR sensor, and an average frame exposure duration corresponding to the image-capturing sensor;

initiating data capture by the LiDAR sensor;

initiating data capture by the image-capturing sensor in conjunction with the initiating of data capture by the LiDAR sensor, wherein the initiating of data capture by the image-capturing sensor occurs after the delay timing has elapsed;

determining a synchronization error time, wherein the synchronization error time is a period of time corresponding to a correction window for synchronization of the LiDAR sensor and the image-capturing sensor and the delay timing is based on the synchronization error time;

determining an average synchronization error time; and adjusting the delay timing responsive to the average synchronization error time exceeding a first threshold value.

12. The system of claim 11, wherein the packet capture timing corresponding to the LiDAR sensor includes at least one of: a first time delay between capture of a packet of LiDAR data and sending of the packet to a LiDAR driver, a second time delay between reception of the packet by the LiDAR driver and sending of the packet to an image-capturing driver, a third time delay between reception of the packet by the image-capturing driver and sending of the packet to the image-capturing sensor, and a fourth time delay between reception of the packet by the image-capturing sensor and prompting the image-capturing sensor to capture image data.

13. The system of claim 11, wherein the average frame exposure durations corresponding to the image-capturing sensor is a running average of two or more of the most recent frame exposure durations.

14. The system of claim 11, wherein the operations further comprise:

determining a variance in the synchronization error time; and adjusting the delay timing responsive to the variance in the synchronization error time exceeding a second threshold value.

* * * * *